US006752718B2

(12) United States Patent
Kawazu

(10) Patent No.: US 6,752,718 B2
(45) Date of Patent: Jun. 22, 2004

(54) ROLE PLAYING VIDEO GAME USING CARDS

(75) Inventor: Akitoshi Kawazu, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 9 days.

(21) Appl. No.: 09/964,800

(22) Filed: Sep. 28, 2001

(65) Prior Publication Data

US 2002/0137563 A1 Sep. 26, 2002

(30) Foreign Application Priority Data

Mar. 26, 2001 (JP) ........................................ 2001-087448

(51) Int. Cl.⁷ ............................................... A63F 13/00
(52) U.S. Cl. ............................................. 463/30; 463/1
(58) Field of Search .................................. 463/30–31, 1, 463/9, 16, 32, 33, 43, 11; 273/298, 304–308

(56) References Cited

U.S. PATENT DOCUMENTS 4,305,131 A * 12/1981 Best ............................ 345/716

FOREIGN PATENT DOCUMENTS

GB 2144644 * 3/1985 ............. A63F/9/22

OTHER PUBLICATIONS

"Final Fantasy VIII Instruction Manual & Mini–Walkthrough", Copyright 1999–2000, Square Co, Ltd., pps 1–9.*
Final Fantasy VIII by Electronic Arts, Release Date: Jan. 26, 2000, [http://www.pcgr.com/reviews/roleplaying.moreinfo_900.asp], pp 1–2.*

Magic: The Gathering Online [http://www.wizards.com/default.asp?x=magic/magiconline]Copyright 1995–2003, pp 1–2.*
"Weekly FAMITSU, vol. Apr. 6, 2001", Enterbrain, Inc., received by Japanese Patent Office Library on Mar. 26, 2001, vol. 16, No. 14, 642 issue, pp. 76–78, together with a partial English language translation of the same.
"Weekly FAMITSU, vol. Oct. 6, 2002", Enterbrain, Inc., Oct. 6, 2002, vol. 15, No. 40, 616 issue, p. 213, together with a partial English language translation of the same.
"Weekly FAMITSU, vol. Mar. 9, 2001", Enterbrain, Inc., Mar. 9, 2002, vol. 16, No. 10, 638 issue, pp. 24–25, together with a partial English language translation of the same.

* cited by examiner

Primary Examiner—John M. Hotaling, II
Assistant Examiner—Aaron Capron
(74) Attorney, Agent, or Firm—Greenblum & Bernstein P.L.C.

(57) ABSTRACT

A game program realizes a role playing game using cards with originality and amusement. In processing for selecting a scenario, a character is solicited to obtain three scenario cards in advance. Any of the scenario cards is selected from the three scenario cards according to operation of a player. When any of the scenario cards is selected, game development processing based on a scenario of the selected scenario card is executed. Subsequently, it is determined if conditions for clearing a scenario, for which the game development processing is executed, defined in the scenario in advance are met. The game development processing based on the scenario continues to be executed until the conditions for clearing the scenario are met. When the conditions for clearing the scenario are met, games based on scenarios of the remaining two scenario cards are developed.

24 Claims, 13 Drawing Sheets

517  518  519

520

ROLE PLAYING VIDEO GAME USING CARDS

BACKGROUND OF THE INVENTION

1. Field of the Invention

The present invention relates to video games. More specifically, the present invention relates to a game program for realizing a role playing game (hereinafter referred to as RPG) which changes a development of a story forming the game on a screen according to an operational input by a player.

2. Description of the Related Art

A video game using cards, such as playing cards is known. In addition, RPGs, using cards have been put in practical use. An RPG using cards makes cards for generating predetermined effects in a game such as magic cards and power-up cards to appear. A character in the game uses each of these cards as one of items that the character can use.

However, in the above-mentioned card game, an ordinary card game using cards is simply played on a screen, thus, although it is convenient in progressing the game, amusement more than that inherent in the card game cannot be offered to a player. In addition, in the RPG using cards, card items simply appear as either weapon items or protection items that have been used frequently in the RPG. Thus, originality and amusement arising from using cards cannot be offered to a player.

SUMMARY OF THE INVENTION

The present invention has been devised in view of these problems, and it is an object of the present invention to provide a game program for enabling a player to play an RPG using cards having originality and amusement, a recording medium having the game program stored therein, a method of processing story developments in an RPG and a game apparatus.

In order to solve the above-mentioned problems, according to an aspect of the present invention, a game program for causing a computer to execute a role playing game which changes a development of a story forming the game on a screen according to an operational input of a player is provided. The game program causes the computer to execute a displaying procedure for displaying a group of cards on the screen; a selecting procedure for selecting one of the displayed cards according to an operational input of the player; and a determining procedure for determining a development of the story according to a selected card.

Therefore, the computer executes processing in accordance with the game program to display the group of cards on the screen and one of the cards is selected by an operational input of the player, whereby the story in the RPG is developed in various ways. Thus, originality and amusement of the RPG using cards can be offered to the player.

In addition, according to another aspect of the present invention, the game program causes the computer to display the cards in a scene for selecting a course of a character appearing in the game, and, determine the course of the character in the game according to the selected card. Therefore, when a card is selected by the operational input of the player, a course of the character is determined in various ways according to the selected card. Thus, a story is developed in various ways for each player.

In addition, according to another aspect of the present invention, the game program causes the computer to display the cards in a scene for selecting an action of a character appearing in the game, and, determine an action of the character in the game according to the selected card. Therefore, when a card is selected by the operational input of the player, an action of the character is determined in various ways according to the selected card. Thus, a story is developed in various ways.

In addition, according to another aspect of the present invention, a scenario of the story is determined according to the selected card. Therefore, when a card is selected by an operational input of a player, a scenario of the story changes according the selected card. Thus, the story is surely developed in various ways.

In addition, according to another aspect of the present invention, the game program causes the computer to execute a procedure for having the character virtually obtain a group of cards corresponding to different scenarios, respectively. Moreover, in the determining procedure, a scenario corresponding to any of the selected cards is determined as a scenario of the story. Therefore, after the character virtually obtains a group of cards corresponding to different scenarios, respectively, a scenario of the story is determined at the point when any of the cards is selected. The story thereafter is developed in accordance with the determined scenario.

In addition, according to another aspect of the present invention, the game program causes the computer to execute the obtaining procedure in the first scene of the role playing game. Therefore, a development of the story varies for each player from the start of the role playing game, and thus, amusement of the RPG is increased.

In addition, according to other aspects of the present invention, the game program causes the computer to read a program recorded in a recording medium, whereby effects similar to those described above can be realized. In addition, according to other aspects of the present invention, the game program causes the computer to execute processing in steps to be written, whereby effects similar to those described above can be realized. Therefore, processing steps to be written are executed using hardware such as a general-purpose computer or a general-purpose game apparatus. Consequently, a story development technology in the role playing game of the present invention can be easily implemented using the hardware.

Other objects and advantages besides those discussed above shall be apparent to those skilled in the art from the description of preferred embodiments of the invention which follows. In the description, reference is made to accompanying drawings, which form a part hereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

Embodiments of the present invention will be hereinafter described with reference to the accompanying drawings. Further, in the following descriptions, the case in which the present invention is applied to a game machine for home use will be explained as an example.

Figure 1:
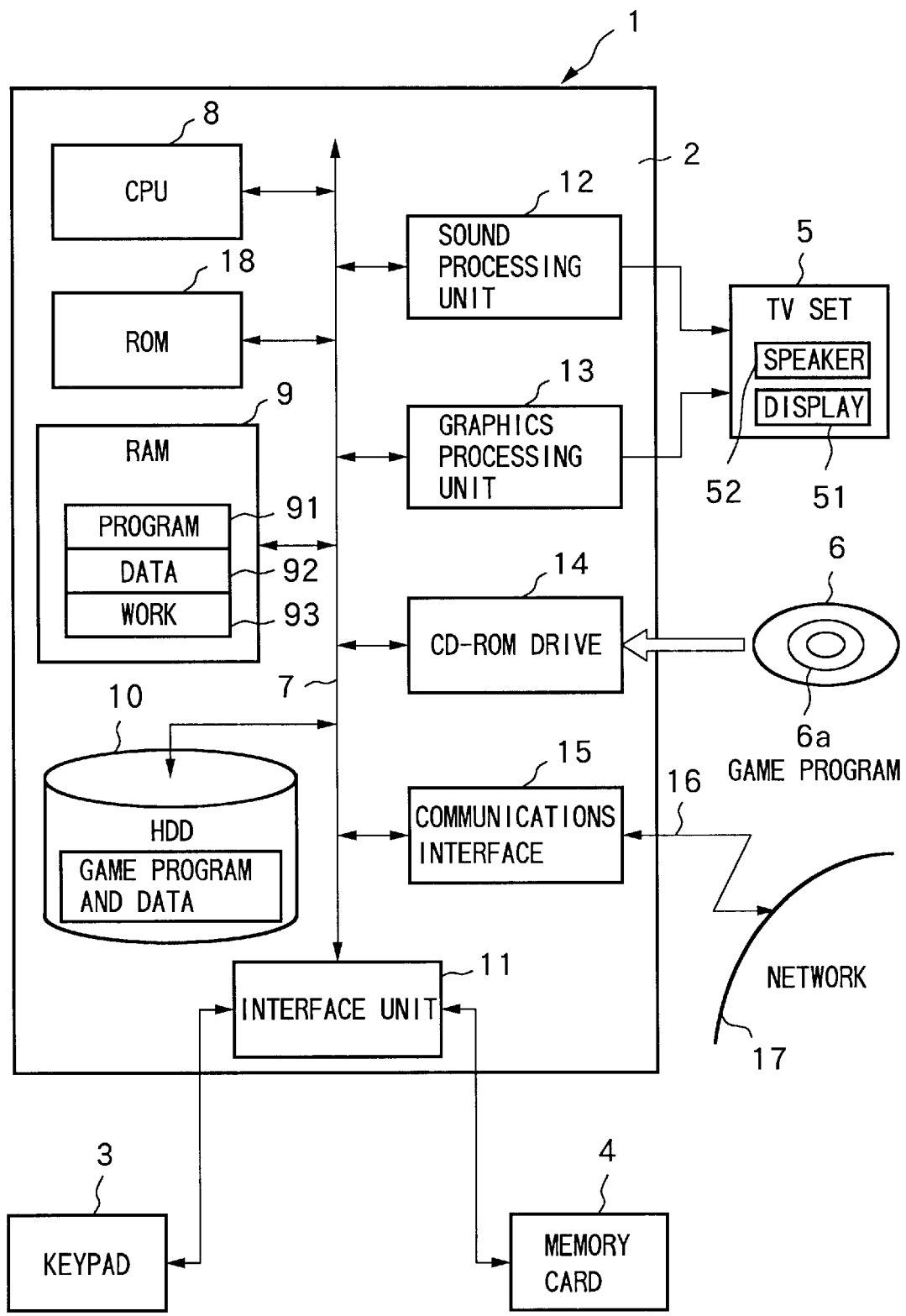
FIG. 1 is a block diagram showing an overall configuration of a game apparatus to which an embodiment of the present invention is applied.

FIG. 1 is a block diagram showing a configuration of a game apparatus in accordance with this embodiment of the present invention. As shown in the figure, this game apparatus 1 includes, for example, a game machine main body 2, a keypad 3, a memory card 4, a TV set 5 and a CD-ROM 6.

The game machine main body 2 is composed of, for example, a CPU 8 (Central Processing Unit), an ROM (Read Only Memory) 18, an RAM (Random Access Memory) 9, an HDD (Hard Disk) 10, an interface unit 11, a sound processing unit 12, a graphics processing unit 13, a CD-ROM (Compact Disc Read Only Memory) drive 14, a detachable CD-ROM 6 and a communications interface 15, which are connected to each other via a bus 7.

The CPU 8 sequentially executes a program stored in the RAM 9 to perform processing for progressing a game based on a basic program such as a boot program and an OS (Operating System) stored in the ROM 18. In addition, the CPU 8 controls operations of each of components 9 to 15 in the game machine main body 2.

The RAM 9 is used as a main memory of the game machine main body 2 and stores a program and data required for progress of a game, which are transferred from the CD-ROM 6. In addition, the RAM 9 is also used as a work area in executing a program. That is, a program storage area 91, a data storage area 92, a work area 93 and the like are allocated to the RAM 9. A program and data to be stored in the program storage area 91 and the data storage area 92 are read from the CD-ROM 6 by a CD-ROM drive 14 in accordance with control of the CPU 8 and transferred to the RAM 9. Various kinds of data required during progress of a game are temporarily stored in the work area 93.

A game program and data received from an external network 17 via the communications interface 15 and a communications line 16 are stored in the HDD 10. The detachable keypad 3 and the memory card 4 are connected to the interface unit 11. The interface unit 11 controls exchanges of data between the keypad 3 and the memory card 4 that are in the outside of the game machine main body 2 and the CPU 8 and the RAM 9. Further, the keypad 3 is provided with direction keys and various buttons. A player operates these keys and buttons to execute inputs required for progress of a game, such as an instruction to move and an instruction to operate to the player's own character. In addition, the memory card 4 saves data indicating a state of progress of a game.

The sound processing unit 12 performs processing for reproducing sound data such as BGM (Background Music) and sound effects corresponding to a state of progress of a game in accordance with an instruction from the CPU 8 and outputs the sound data to the TV set 5 as a voice signal.

The graphics processing unit 13 performs three-dimensional graphic processing in accordance with an instruction from the CPU 8 and generates image data corresponding to a state of progress of a game. The graphics processing unit 13 adds a predetermined synchronization signal to the generated image data to output the data to the TV set 5 as a video signal.

The CD-ROM drive 14 drives the CD-ROM 6 set in the game machine main body 2 in accordance with an instruction from the CPU 8 and transfers a program and data stored in the CD-ROM 6 to the RAM 9 via the bus 7.

The communications interface 15 is connected to the external network 17 via the communications line 16 and performs processing for exchanging a program and data with the external network 17 in accordance with an instruction from the CPU 8.

The CD-ROM 6 stores a program and data (game program 6a) required for progress of a game. The CD-ROM 6 is driven by the CD-ROM drive 14, whereby the stored program and data are read. The program and data read from the CD-ROM 6 are transferred to the RAM 9 from the CD-ROM drive 14 via the bus 7.

The TV set 5 is provided with a display screen 51 consisting of a CRT (Cathode Ray Tube) or the like for displaying an image corresponding to a video signal from the graphics processing unit 13 and a speaker 52 for outputting voices corresponding to a voice signal from the sound processing unit 12. Usually, a television receiver is used as the TV set 5.

Figure 2:
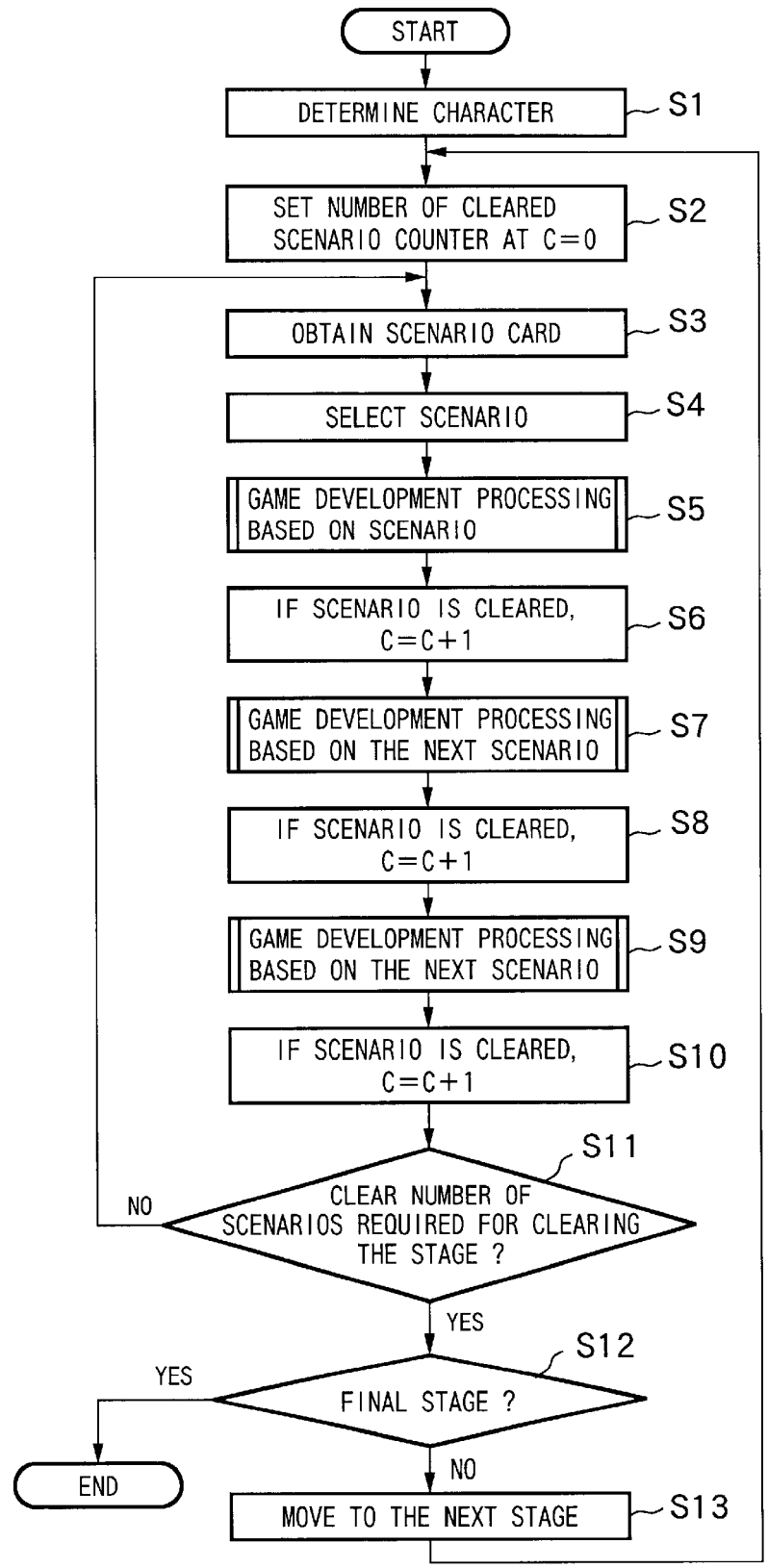
FIG. 2 is a main flow chart showing processing procedures of a CPU.

In this embodiment in accordance with the above-mentioned configuration, when a game is started, the CPU 8 secures an area for storing information in the RAM 9, whereby the program storage area 91, the data storage area 92, the work area 93 and the like are secured in the RAM 9. Then, upon receiving a game starting request, the CPU 8 reads information required for a game to be started from the CD-ROM 6 into the RAM 9, whereby a game program is stored in the program storage area 91 and various kinds of data are stored in the data storage area 92. The CPU 8 executes processing indicated in a flow chart of FIG. 2 in the first place based on the game program stored in the program storage area 91.

Figure 3:
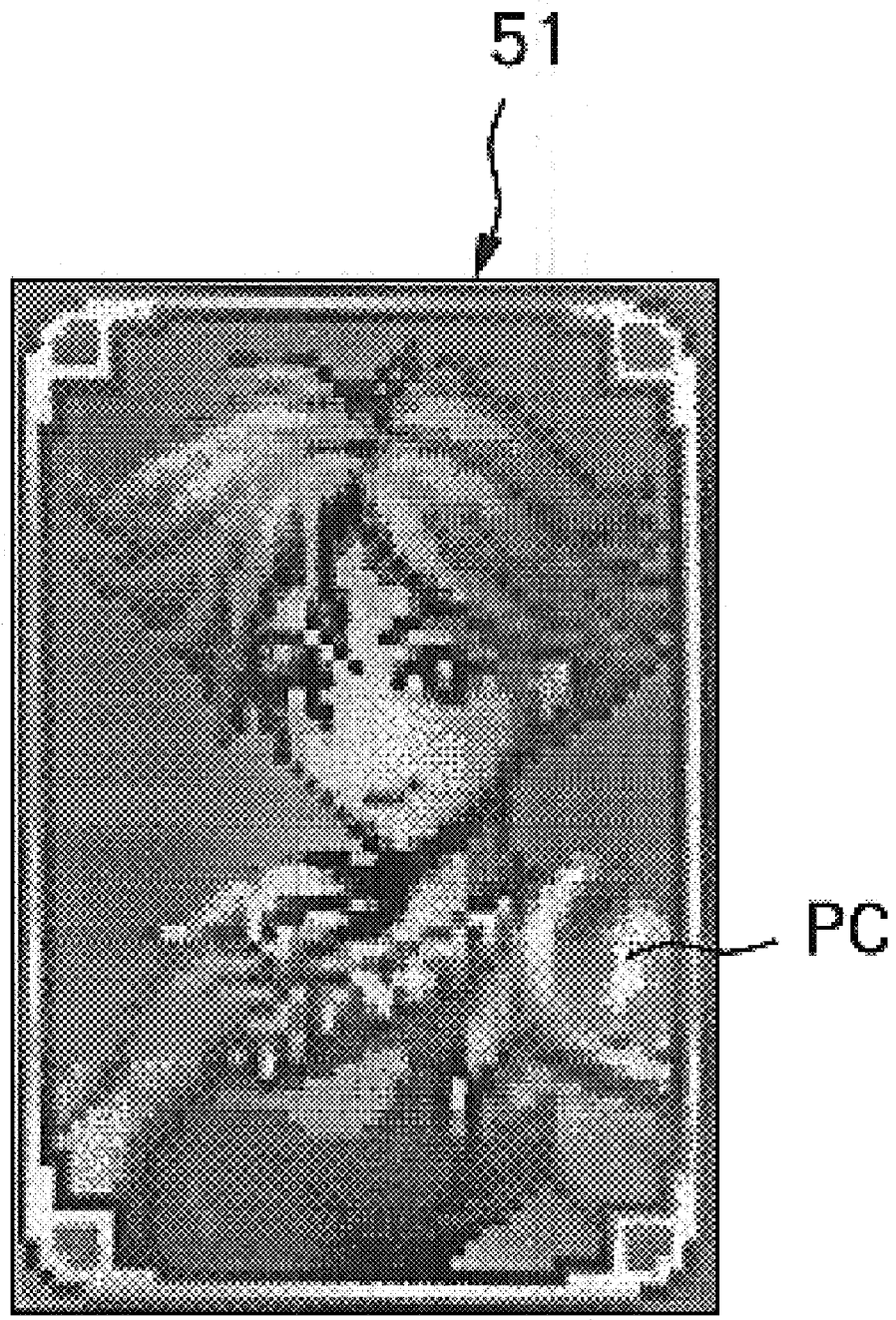
FIG. 3 illustrates an example of display of a player character in the form of a card.

That is, the CPU 8 executes character determination processing first (step S1). This character determination processing is processing for determining a character of the player among a group of characters and causes the display 51 to display a group of (e.g., seven) questions consisting of a group of choices, respectively. When selection of any choice is completed in response to all the questions, a specific character is determined as a character of the player (player character PC), and the player character PC is displayed on the display 51 as a card as shown in FIG. 3. That is, in this embodiment, unlike an ordinary RPG, the player character PC appears in the form of a card instead of appearing as a personified character.

Further, this processing of step S1 is only executed when an RPG in accordance with this embodiment is played for the first time. When the game is subsequently started, processing is started regarding the selected character as a player character PC (card) based on saved data stored in the memory card 4. In addition, on the display 51, display is divided into an upper and lower part. In the lower part of the screen, a player character PC in the form of a card is mainly displayed, and an enemy character and other characters in the form of a card, which appear in the following description, are mainly displayed in the upper part of the screen.

Subsequently, after setting "0" in a counter C for counting the number of cleared scenarios (step S2), scenario obtaining processing is executed (step S3). A player character PC meets a character operated by a computer in a predetermined place (e.g., a town) and obtains information concerning a certain scenario by the character, whereby a scenario card for the scenario can be obtained. Therefore, the number of available scenario cards varies according to the number of characters that the player character PC meets. In addition, in this scene, the player may propose that a character the player character PC meets be a comrade of the player character PC. In this way, it becomes possible to increase the number of allies. Here, scenario cards are associated with scenarios forming a different development and a story, respectively.

Figure 4:
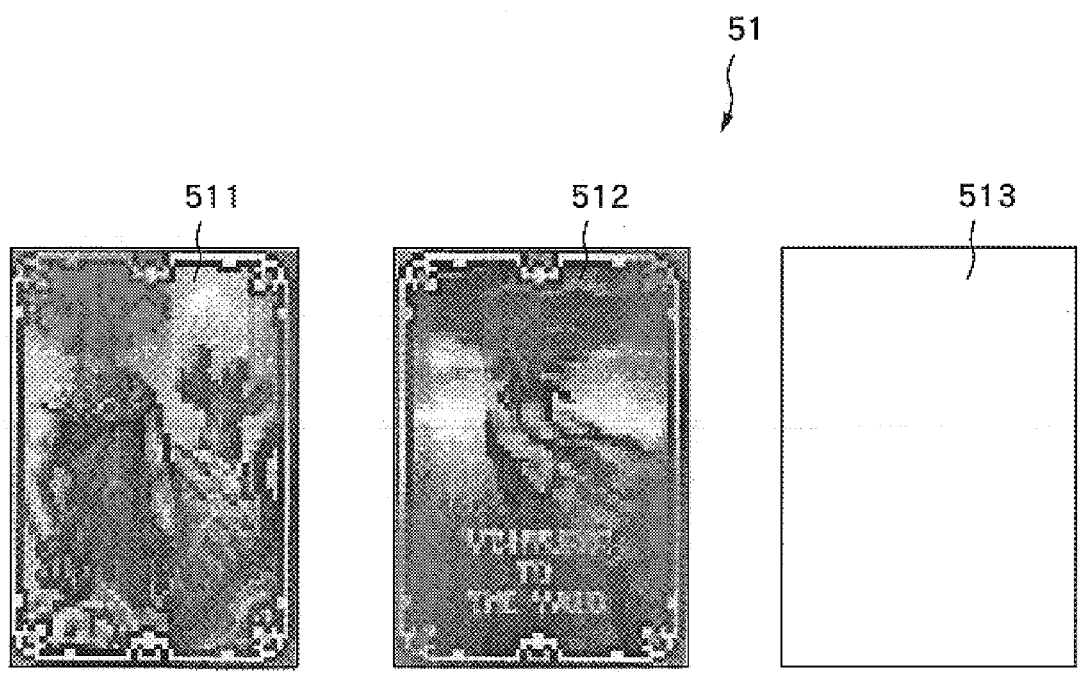
FIG. 4 illustrates examples of display of a scenario card.

Next, scenario selection processing is executed (step S4). In this scenario selection processing, the scenario card obtained in step S3 is used. As shown in an example of FIG. 4, scenario cards 511, 512 and 513 obtained by the player character PC are displayed on the display 51. Any one of the three scenario cards 511, 512 and 513 is selected according to operation of the keypad 3 by the player.

When any one of the scenario cards is selected, game development processing based on the scenario to be described later is executed (step S5), and then if the scenario is cleared by this game development processing, a value of the counter C is incremented (step S6). Further, whether the scenario is cleared or not is determined by whether a mission is accomplished or not as described later. A mission provided for each scenario in this context includes tasks such as defeating a boss monster of an opponent or finding a predetermined item.

When game processing based on the scenario ends in accordance with operation of the keypad 3 by the player and progress of a game, in the two remaining scenario cards among the above-mentioned three scenario cards 511, 512 and 513, game development processing based on a scenario corresponding to any one of the cards is started (step S7). Then, if the scenario is cleared by this game development processing, a value of the counter C is incremented (step S8).

In addition, when a game based on the scenario ends, game development processing based on a scenario of the remaining one scenario card among the above-mentioned three scenario cards 511, 512 and 513 is executed (step S9). If the scenario is cleared in this game development processing, a value of the counter C is incremented (step 10).

Subsequently, it is determined whether or not the number of scenarios required for clearing the stage is cleared based on the value of the counter C (step S11). If the number of scenarios required for clearing the stage is not cleared, the processing of step S3 and subsequent steps is repeated. Further, scenario cards of the number required for clearing a stage or more (e.g., five) are obtained before starting the stage and an arbitrary three scenario cards among them are cleared, whereby the stage may be cleared.

Then, if the number of scenarios required for clearing the stage is cleared (step S11; YES), it is determined whether or not the stage cleared this time is a final stage among all the stages set in this RPG (step S12). If it is not the final stage and stages that should be cleared still remain, the processing moves to the next stage (step S13) and processing of step S2 and subsequent steps is repeated. In addition, here, the processing may return to step S1 instead of step S2. In this way, it becomes possible for a player to play using a different player character for each stage.

That is, the same processing as in the above-mentioned step S2 to step S12 is performed in each stage, and games are developed by stories based on three types of scenarios corresponding to three scenario cards. Then, when all the games based on the three types of scenarios corresponding to the three scenario cards are cleared, the processing moves to the next stage. Finally, when all the stages set in this RPG are cleared, the determination in step S12 is YES, and the game is completely performed.

Figure 5:
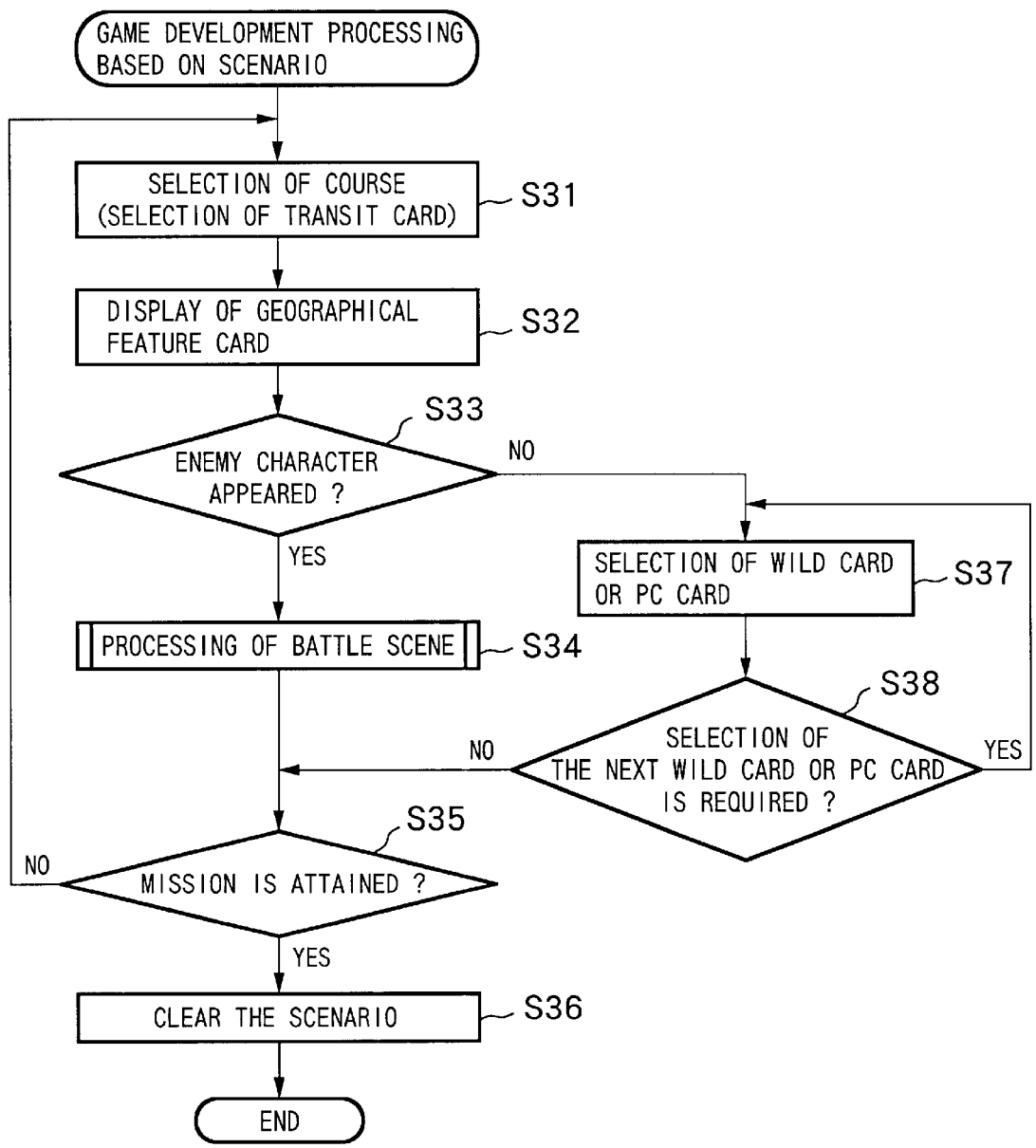
FIG. 5 is a flow chart showing details of exemplary processing for game developments based on a scenario.

FIG. 5 is a flow chart showing details of exemplary game development processing based on scenarios to be executed in the above-mentioned steps S5, S7 and S9. First, course selection processing (selection processing of a transit card) is executed (step S31). In this course selection processing (selection processing of a transit card), a group of transit cards are displayed on the display 51. On the surface of each of the transit cards, a figure indicating "climb a ladder", "go up the stairs", "open a door" or the like is displayed. The player selects a transit card corresponding to an action that the player wishes a character to take among the displayed transit cards by operation of the keypad 3. Thus, game processing is executed according to the selected transit card and the RPG progresses.

Figure 6:
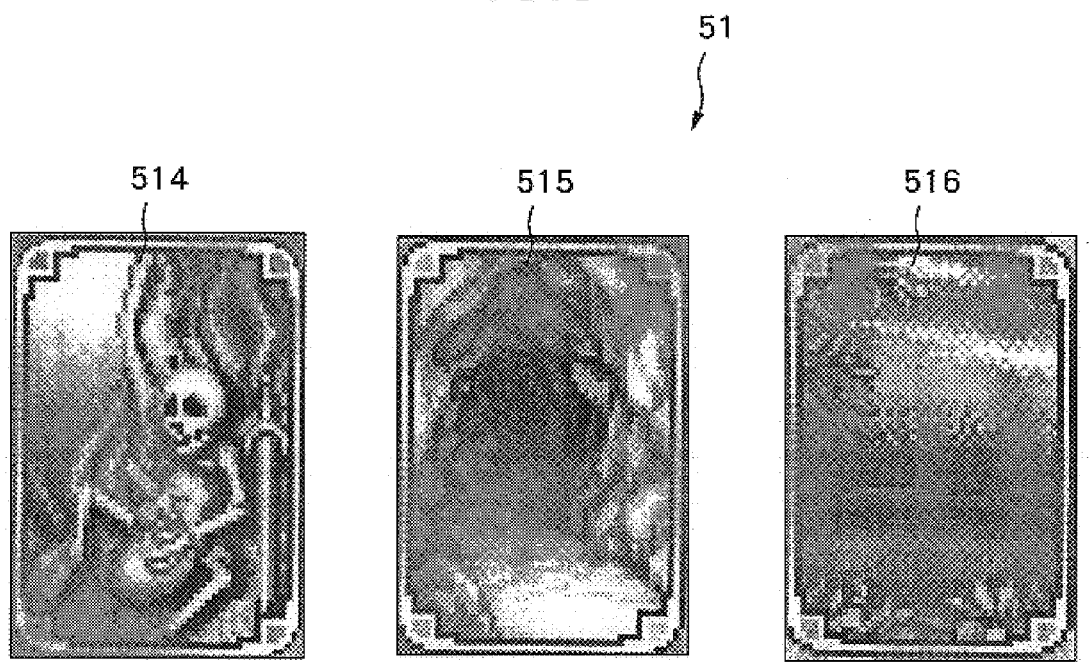
FIG. 6 illustrates examples of display of a geographical feature (obstacle geographical feature) card.

Subsequently, a geographic feature card relating to the selected transit card is displayed on the display 51. Examples of the geographic feature card are shown in 514, 515 and 516 of FIG. 6. Figures indicating "passage where a skeleton is lying", "cave", "lake" or the like are displayed on displaying surface of these geographic feature cards.

The player instructs the player character PC to take any action with respect to a geographic feature card displayed on the screen. In addition, in the case of a certain geographic feature card, an enemy character appears simultaneously with it. In this case, a battle is started. Battle processing will be described in detail later.

In a scene in which the player character PC does not encounter an enemy (scene other than a battle), the player executes selection processing for selecting any one of PC (player character) cards and wild cards with respect to the displayed geographic feature card (step S37). These cards are PC (player character) cards and wild cards that the player character PC owns virtually, with which a player character PC determines an operation on a game.

Here, as specific examples of the wild card, there are cards indicating "advance", "look out over", "try at any rate" and the like. On the other hand, as specific examples of the PC (player character) card, there are cards indicating "run away", "check well", "medical herb", "jump", "release a trap", "open a lock", "thrust", "cut", "release an arrow", "magic of fire", "magic of water" and the like.

Figure 13:
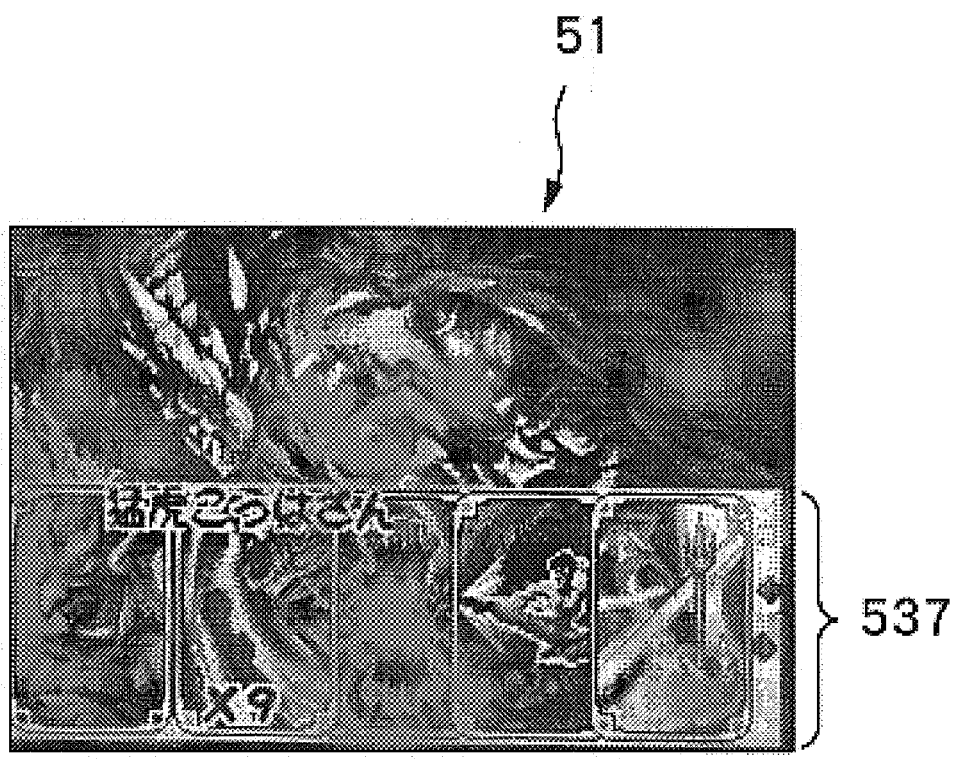
FIG. 13 illustrates an example of a screen of an entire game screen.

One of a group of cards consisting of PC cards and a group of cards consisting of wild cards is displayed on a lower part 537 of the screen as shown in FIG. 13 according to an operation of the player. Then, the player operates the keypad 3 to select one of the cards, whereby an action of the player character PC is determined.

For example, in a geographic feature card indicating a certain place (a cave, a hole opened in a large tree, or the like), a "look out over" card being a wild card is used. Then, a geographic card indicating a treasure box is displayed. Here, a "check well" card being a PC (player character) card is used. Then, it is displayed on the screen that releasing of a trap and opening a lock are required to open this treasure box. Thus, "release a trap" and "open a lock" cards being PC (player character) cards are used, whereby the treasure box is opened and items inside the treasure box are displayed on the screen. Subsequently, a "try at any rate" card being a wild card is used, whereby the items in the box can be obtained.

Figure 8:
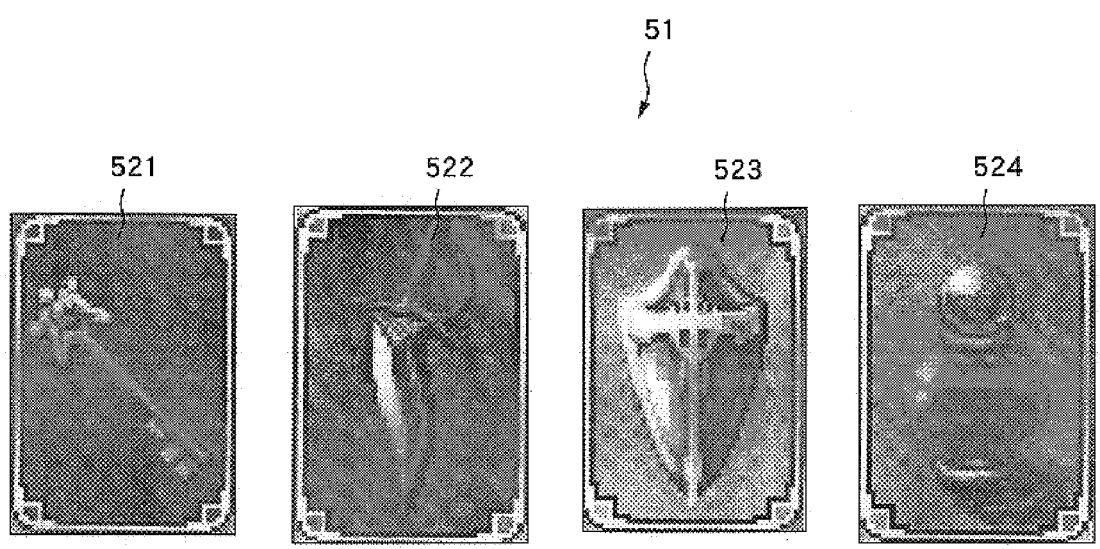
FIG. 8 illustrates examples of display of an item card.

Here, as available items, there are money and a key 521, a knife 522, a protector 523, a pot 524 and the like shown in FIG. 8. Any player character PC is selected by an operation of the keypad 3 to have the player character PC to hold the obtained items, whereby the obtained item can be used.

In addition, if it is not particularly necessary to take a specific action such as "check well" with respect to the displayed geographical feature, an "advance" card being a wild card is used, whereby the processing advances to the next geographical feature card (transit card).

That is, when selection of a transit card is executed in step S31, a geographical card relating to the selected transit card is displayed on the display 51 (step S32). Subsequently, it is determined whether or not an enemy character has appeared simultaneously with the appearance of this geographical feature card (step S33) and, if an enemy character has appeared, processing of a battle screen to be described later is executed (step S34). Thereafter, in this processing of battle screen, it is determined whether or not the player character PC has attained a mission set on the scenario (step S35) and, if the mission has not been attained, the processing of step S31 and subsequent steps is repeated. Then, if the player character PC has attained the mission set on the scenario, it is determined that the scenario is cleared (step S36).

Figure 7A:
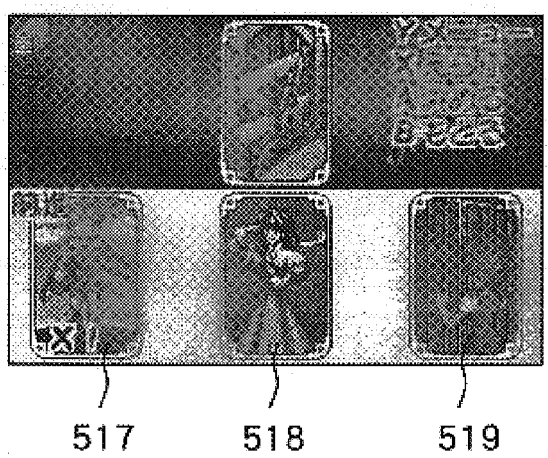
FIGS. 7A and 7B illustrate examples of display of a PC card and a wild card.
Figure 7B:
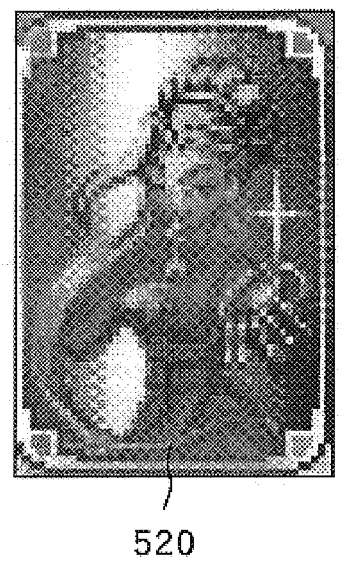

In addition, if it is determined that an enemy character has appeared as a result of the determination in step S33, processing for selecting a wild card or a PC card is executed (step S37). In the processing for selecting a wild card or a PC card, as shown in FIGS. 7A and 7B, the computer causes the display 51 to display PC cards 520 or wild cards 517 to 519. Here, the wild cards 517, 518 and 519 showing examples indicate "advance", "look out over" and "try at any rate", respectively, and the PC card 520 is a card indicating "open a lock". That is, in an ordinary RPG, a player character PC takes an action on a screen according to an operation of the keypad 3, whereas, in the RPG in accordance with this embodiment, a player character PC is not made to take an action on the screen. Instead, the PC cards and wild cards 517 to 520 are selected, whereby it is assumed that the player character PC has taken an action corresponding to the selected card. Thus, the game processing is executed according the selected PC cards or the wild cards 517 to 520 and the RPG progresses. Then, in step S38, it is determined whether or not selection of the next wild cards or PC cards is necessary. If it is necessary, the processing of step S37 and subsequent steps is repeated. If it is unnecessary, the processing advances to the above-mentioned step S35.

Figure 9:
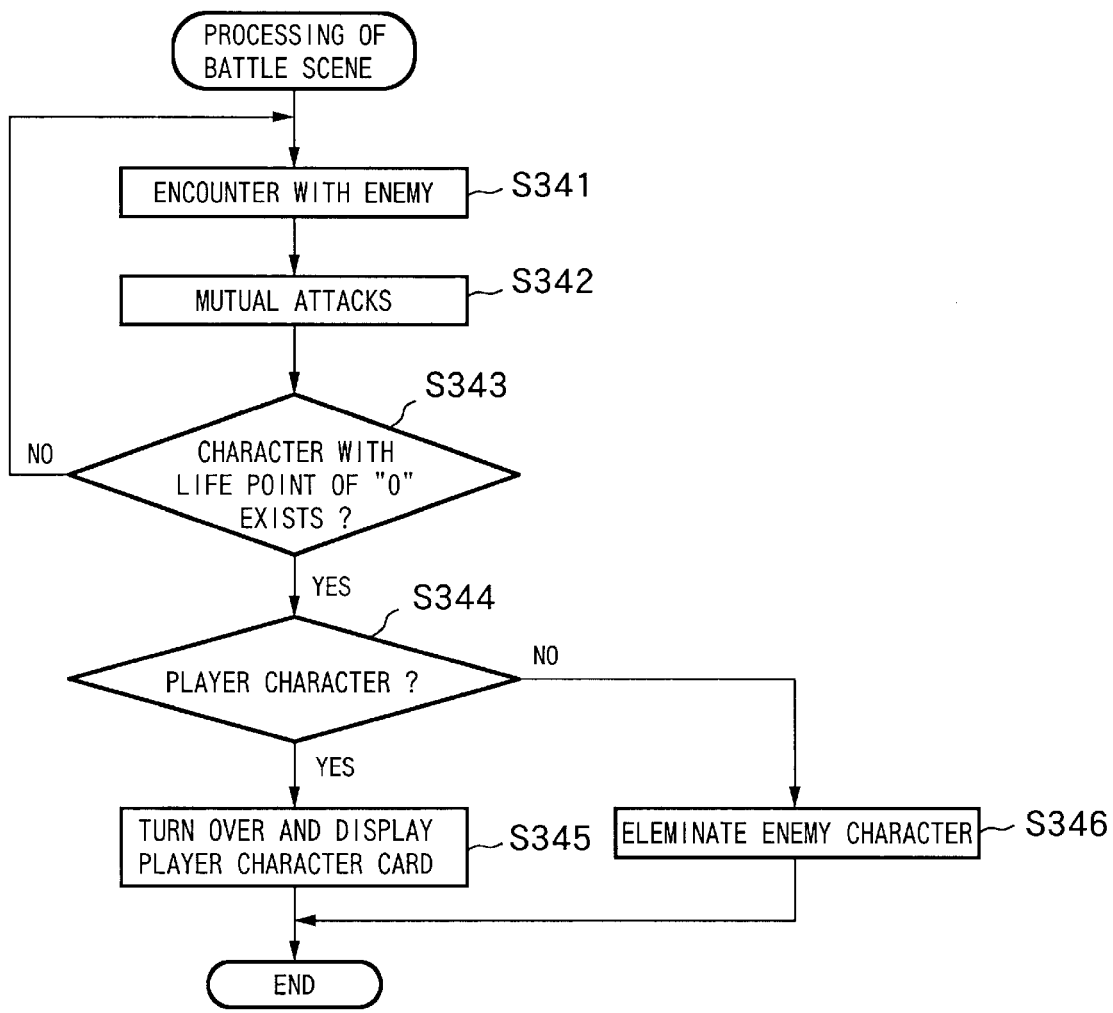
FIG. 9 is a flow chart showing details of exemplary processing of a battle screen.
Figure 10:
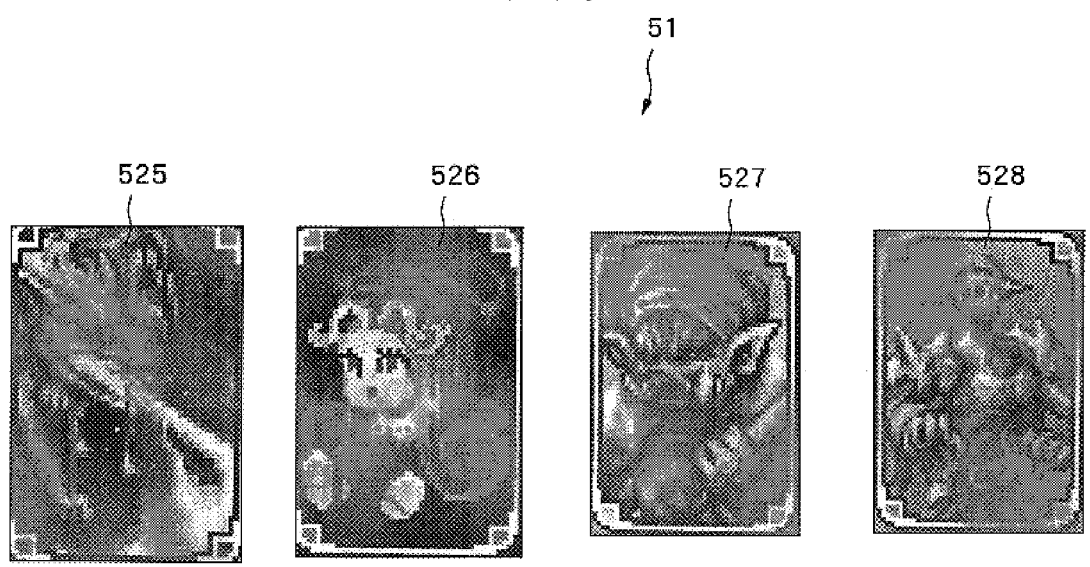
FIG. 10 illustrates examples of display of an enemy card.

FIG. 9 is a flow chart showing details of the above-mentioned processing of a battle scene (step S34). In this processing of a battle scene, processing of encounter with an enemy is executed first (step S341). That is, when any geographical feature card is selected in the above-mentioned processing of step S32, any of enemy cards 525 to 528 shown in FIG. 10 as examples may be displayed on the display 51, whereby it is assumed that the player character PC has encountered an enemy character.

Figure 11:
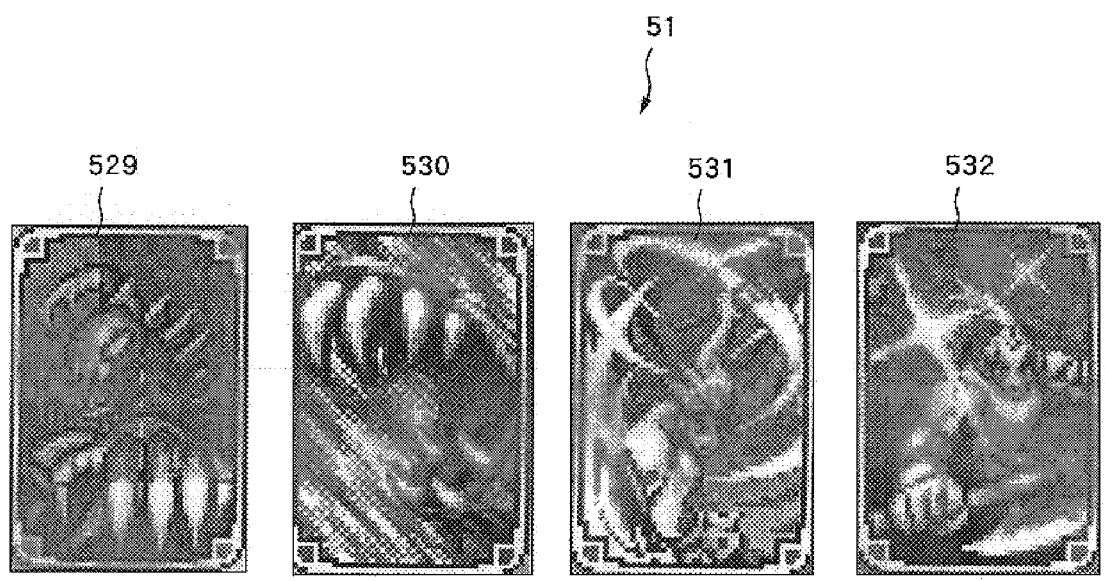
FIG. 11 illustrates examples of a trick card.
Figure 12:
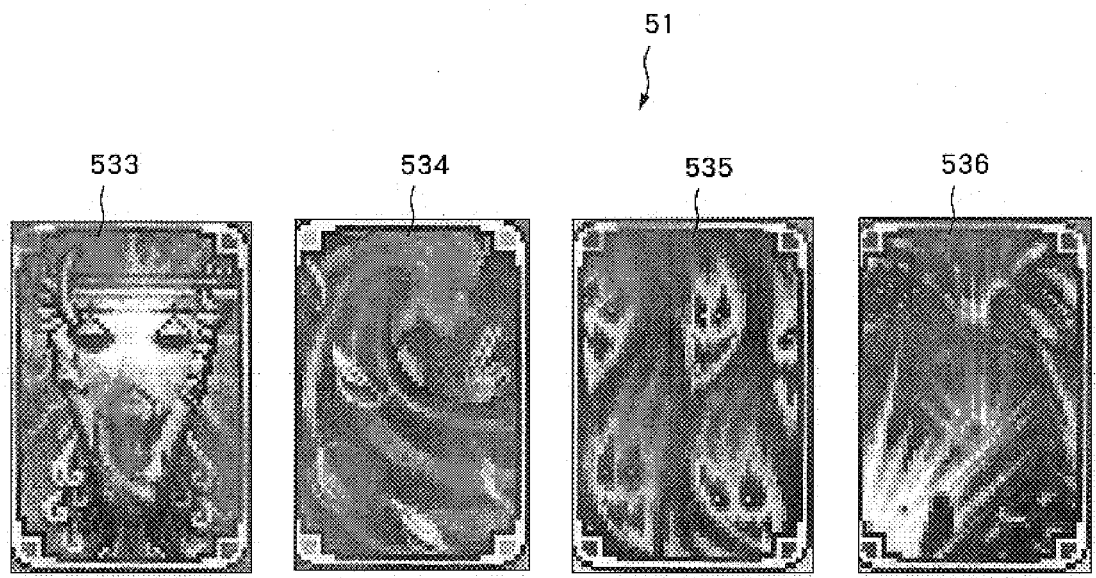
FIG. 12 illustrates examples of a magic card.

Next, processing of mutual attacks is executed (step S342). In this processing of mutual attacks, the computer causes the display 51 to display trick cards 529 to 532 shown in FIG. 11 or magic cards 533 to 536 shown in FIG. 12. Then, for example, with the trick cards 529 to 532 displayed, any of them is selected by operation of the keypad 3. When a trick card is selected, numerals in a range set in the trick card in advance are sequentially displayed at a high speed on the card. Then, when buttons are operated on the keypad 3 at the timing when any of the numerals is displayed, the numeral is determined as a value of attacking power of the player character PC. The determined value of attacking power of the player character PC is compared with a value of an enemy character card that is an object of attack of the player character PC at that point, whereby a result of the battle is determined. Moreover, if a result of the battle is determined in this way, subtraction processing is performed with respect to a life point set in the player character PC (card) in advance and a life point set in the enemy character (card) in advance.

Next, it is determined whether or not the life point set in the player character PC (card) in advance or the life point set in the enemy character (card) has become "0" (step S343). If any of the life points has become "0", it is determined whether or not it is the life point of the player character PC (card) (step S344) and, if it is the life point of the player character PC (card), the card is turned over to be displayed (step S345). In addition, if it is not the life point of the player character PC (card) but the life point of the enemy character (card), the enemy character (card) is eliminated (step S346). After turning over the player character card (step S345) and after eliminating the enemy character (step 346), processing returns to that in FIG. 5, step 35.

Further, although the case in which the present invention is realized with a game machine for home use as a platform is described in this embodiment, the present invention may be realized with a general-purpose computer such as a personal computer or an arcade game machine as a platform.

Moreover, a program and data for realizing the present invention are stored in a CD-ROM, which is used as a recording medium in this embodiment. However, a recording medium is not limited to a CD-ROM and may be a DVD (Digital Versatile Disc), other computer readable magnetic and optical recording media or a semiconductor memory. Furthermore, a program and data for realizing the present invention may be provided in the form of being preinstalled in a storage device of a game machine or a computer in advance.

In addition, a program and data for realizing the present invention may be in the form of being downloaded from another apparatus on the network 17 connected by the communications interface 15 shown in FIG. 1 via the communications line 16 to the HDD 10 and used. In addition, the program and the data may be in the form of being recorded in a memory on another apparatus side on the communications line 16 and sequentially stored in the RAM 9 if necessary via the communications line 16 and used.

In addition, a form of providing a program and data for realizing the present invention may be such that the program and the data is provided as a computer data signal superimposed on a carrier wave from another apparatus on the network 17. In this case, the other apparatus on the network 17 is requested from the communications interface 15 via the communications line 16 to transmit the computer data, and the transmitted computer data signal is received and stored in the RAM 9. It is also possible to realize the present invention in the game apparatus 1 using the program and the data stored in the RAM 9 in this way.

As described above, according to the present invention, any of a group of cards displayed on a screen is selected according to an operational input by a player, whereby a story in an RPG can be developed in various ways according to the selected card. Thus, it becomes possible to offer the player originality and amusement of an RPG using cards.

The present invention is not limited to the above embodiments and various changes and modifications can be made within the spirit and scope of the present invention. Therefore, to apprise the public of the scope of the present invention the following claims are made.

The present disclosure relates to subject matter contained in priority Japanese Application No. 2001-087448, filed on Mar. 26, 2001, the contents of which is herein expressly incorporated by reference in its entirety.

What is claimed is:

1. A game program for causing a computer to execute a role playing game which changes a development of a story forming the game on a screen according to an operational input of a player,
   wherein the game program causes said computer to execute:
      a displaying procedure for displaying a plurality of cards on said screen, each card comprising indicia associated with a significance of the card;
      a selecting procedure for selecting one of said plurality of cards displayed in said displaying procedure according to the operational input of the player; and
      a determining procedure for determining the development of said story according to a selected card,
   wherein selecting of each card always directly affects a player character and the development of the story.

2. The game program according to claim 1,
   wherein the game program causes said computer to display said plurality of cards in a scene for selecting a course of a the player character appearing in said game in said displaying procedure, and,
   in said determining procedure, determines the course of said character in said game according to said card selected in said selecting procedure.

3. The game program according to claim 1,
   wherein the game program causes said computer to display said plurality of cards in a scene for selecting an action of a the player character appearing in said game in said displaying procedure, and,
   in said determining procedure, determines an action of said character in said game according to said card selected in said selecting procedure.

4. The game program according to claim 1,
   wherein a scenario of said story is determined in said determining procedure according to a card selected in said selecting procedure.

5. The game program according to claim 4,
   wherein the game program causes said computer to execute a procedure for having said character virtually obtain a plurality of cards corresponding to different scenarios, respectively, and
   in said determining procedure, a scenario corresponding to any of said cards selected in said selecting procedure is determined as a scenario of said story.

6. The game program according to claim 4,
   wherein the game program causes said computer to execute said obtaining procedure in a first scene of said role playing game.

7. A recording medium having recorded therein a computer readable game program for causing a computer to execute a role playing game which changes a development of a story forming the game on a screen according to an operational input of a player,
   wherein the game program causes said computer to execute:
      a displaying procedure for displaying a plurality of cards on said screen, each card comprising indicia associated with a significance of the card;
      a selecting procedure for selecting one of said plurality of cards displayed in said displaying procedure according to the operational input of the player; and
      a determining procedure for determining the development of said story according to a selected card,
   wherein selecting of each card always directly affects a player character and the development of the story.

8. The recording medium according to claim 7,
   wherein the recording medium records a game program for causing said computer to display said plurality of cards in a scene for selecting a course of the player character appearing in said game in said displaying procedure, and,
   in said determining procedure, determining the course of said character in said game according to said card selected in said selecting procedure.

9. The recording medium according to claim 7,
   wherein the recording medium records a game program for causing said computer to display said plurality of cards in a scene for selecting an action of a the player character appearing in said game in said displaying procedure, and,
   in said determining procedure, determining an action of said character in said game according to said card selected in said selecting procedure.

10. The recording medium according to claim 7,
    wherein the recording medium records a game program for determining a scenario of said story in said determining procedure according to a card selected in said selecting procedure.

11. The recording medium according to claim 10,
    wherein the recording medium records a game program for causing said computer to execute a procedure for having said character virtually obtain a plurality of cards corresponding to different scenarios, respectively, and
    in said determining procedure, determining a scenario corresponding to any of said cards selected in said selecting procedure as a scenario of said story.

12. The recording medium according to claim 11,
    wherein the recording medium records a game program for causing said computer to execute said obtaining procedure in a first scene of said role playing game.

13. A method of processing story developments in a role playing game which changes a development of a story forming the game on a screen according to an operational input of a player, comprising:
    displaying a plurality of cards on said screen, each card comprising indicia associated with a significance of the card;
    selecting one of said plurality of cards displayed in said displaying according to the operational input of the player; and
    determining the development of said story according to a selected card, wherein selecting of each card always directly affects a player character and the development of the story.

14. The method of processing story developments in a role playing game according to claim 13,
wherein the displaying further comprises displaying said plurality of cards in a scene for selecting a course of the player character appearing in said game, and,
said determining further comprises, determining the course of said character in said game according to said selected card.

15. The method of processing story developments in a role playing game according to claim 13,
wherein the displaying further comprises displaying said plurality of cards in a scene for selecting an action of the player character appearing in said game, and,
said determining further comprises, determining an action of said character in said game according to said selected card.

16. The method of processing story developments in a role playing game according to claim 13,
wherein a scenario of said story is determined in said determining step according to said selected card.

17. The method of processing story developments in a role playing game according to claim 14, further comprising virtually obtaining a plurality of cards corresponding to different scenarios, respectively,
wherein, said determining further comprises determining a scenario corresponding to any of said selected cards as a scenario of said story.

18. The method of processing story developments in a role playing game according to claim 17,
wherein said obtaining is executed in a first scene of said role playing game.

19. A game apparatus for executing a role playing game which changes a development of a story forming the game on a screen according to an operational input of a player, comprising:

a display controller that causes a computer to display a plurality of cards on said screen, each card comprising indicia associated with a significance of the card;
a selector that selects one of said plurality of cards displayed by said display controller according to the operational input of the player; and
a determining system that determines the development of said story according to a selected card,
wherein selecting of each card always directly affects a player character and the development of the story.

20. The game apparatus according to claim 19,
wherein said display controller causes said computer to display said plurality of cards in a scene for selecting a course of the player character appearing in said game and,
said determining system determines the course of said character in said game according to said selected card.

21. The game apparatus according to claim 19,
wherein said display controller causes said computer to display said plurality of cards in a scene for selecting an action of a the player character appearing in said game and,
said determining system determines an action of said character in said game according to said selected card.

22. The game apparatus according to claim 19,
wherein said determining system determines a scenario of said story according to a selected card.

23. The game apparatus according to claim 19, further comprising an obtaining system that has said character virtually obtain a plurality of cards corresponding to different scenarios, respectively, and
wherein said determining system determines a scenario corresponding to any of said selected cards as a scenario of said story.

24. The game apparatus according to claim 23,
wherein said obtaining system operates in a first scene of said role playing game.

* * * * *

UNITED STATES PATENT AND TRADEMARK OFFICE
CERTIFICATE OF CORRECTION

PATENT NO. : 6,752,718 B2
DATED : June 22, 2004
INVENTOR(S) : A. Kawazu

It is certified that error appears in the above-identified patent and that said Letters Patent is hereby corrected as shown below:

<u>Column 9,</u>
Lines 38 and 46, after "of" delete "a".

<u>Column 10,</u>
Line 31, after "of" delete "a".

<u>Column 12,</u>
Line 21, after "of" delete "a".

Signed and Sealed this

Fifth Day of April, 2005

JON W. DUDAS
*Director of the United States Patent and Trademark Office*